United States Patent [19]

Fredriksson

[11] Patent Number: 5,323,324
[45] Date of Patent: Jun. 21, 1994

[54] YARN TENSION CONTROL SYSTEM

[75] Inventor: Lars-Berno Fredriksson, Kinna, Sweden

[73] Assignee: IRO AB, Ulricehamm, Sweden

[21] Appl. No.: 768,672

[22] PCT Filed: Feb. 15, 1990

[86] PCT No.: PCT/SE90/00098
§ 371 Date: Sep. 30, 1991
§ 102(e) Date: Sep. 30, 1991

[87] PCT Pub. No.: WO90/09474
PCT Pub. Date: Aug. 23, 1990

[30] Foreign Application Priority Data
Feb. 16, 1989 [SE] Sweden .................................. 8900537

[51] Int. Cl.⁵ ...................... G06F 15/46; D03D 49/00
[52] U.S. Cl. .................................... 364/470; 139/452; 364/138
[58] Field of Search ........................ 364/470, 131–136, 364/138, 139, 184, 187; 371/9.1, 11.3; 139/452, 1 R; 66/125 R; 242/47.01

[56] References Cited
U.S. PATENT DOCUMENTS

| | | |
|---|---|---|
| 3,817,059 | 6/1974 | Krause . |
| 4,532,584 | 7/1985 | Federico et al. .................... 364/131 |
| 4,570,257 | 2/1986 | Olson et al. .......................... 364/131 |
| 4,752,044 | 6/1988 | Memminger et al. . |
| 4,835,699 | 5/1989 | Mallard .............................. 364/470 |
| 4,943,927 | 7/1990 | Yarita et al. ........................ 364/470 |

Primary Examiner—Jerry Smith
Assistant Examiner—Steven R. Garland
Attorney, Agent, or Firm—Flynn, Thiel, Boutell & Tanis

[57] ABSTRACT

A yarn tension control system incorporated into a computerized control system of a textile machine for controlling the operation of a fast responding braking or friction device. The braking or friction device is positioned along a weft yarn path and includes a functional control unit operably coupled to the computerized control system, a tension sensing arrangement for sensing the tension of a strand of weft yarn passing therethrough, and a friction force applying arrangement for applying a friction force to the strand of weft yarn in dependence upon the tension sensed by the tension sensing arrangement.

14 Claims, 6 Drawing Sheets

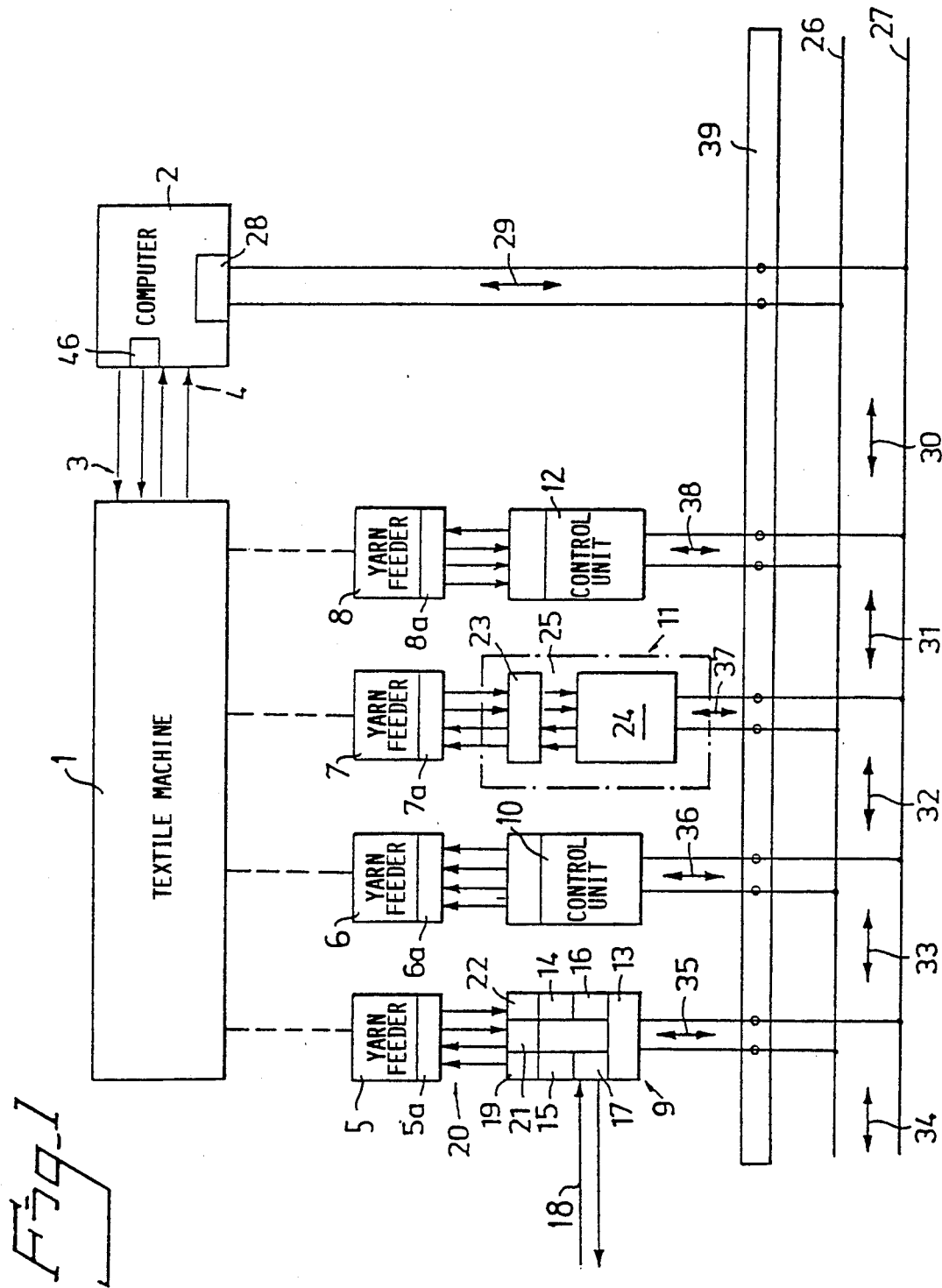

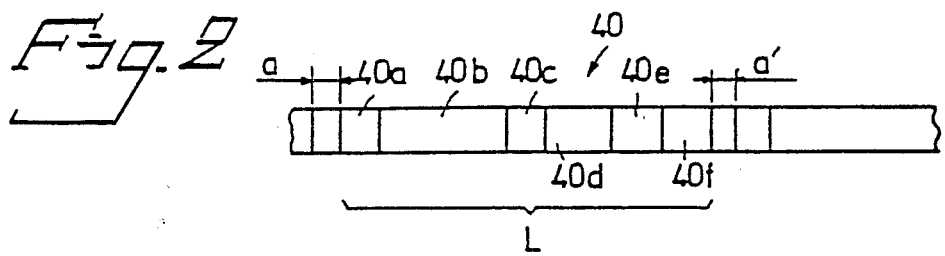
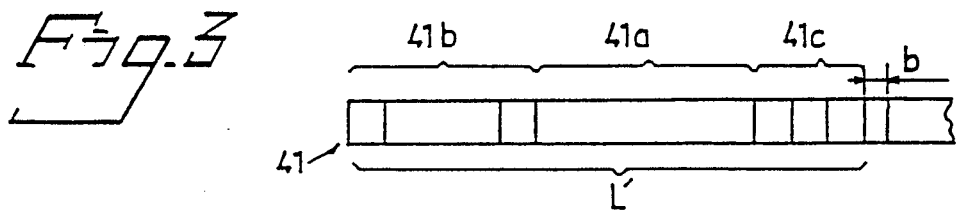
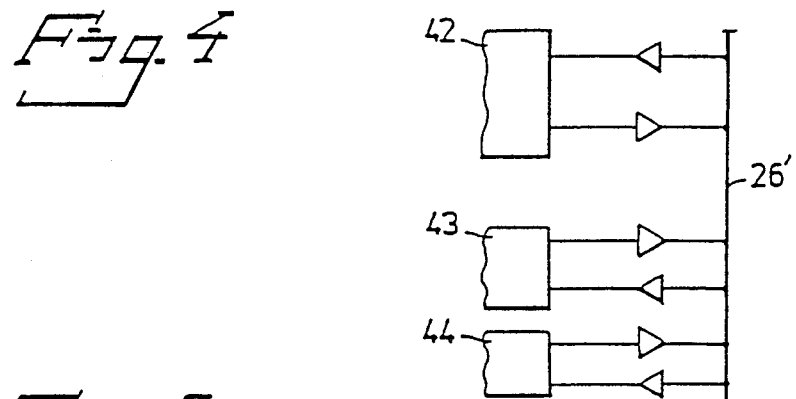
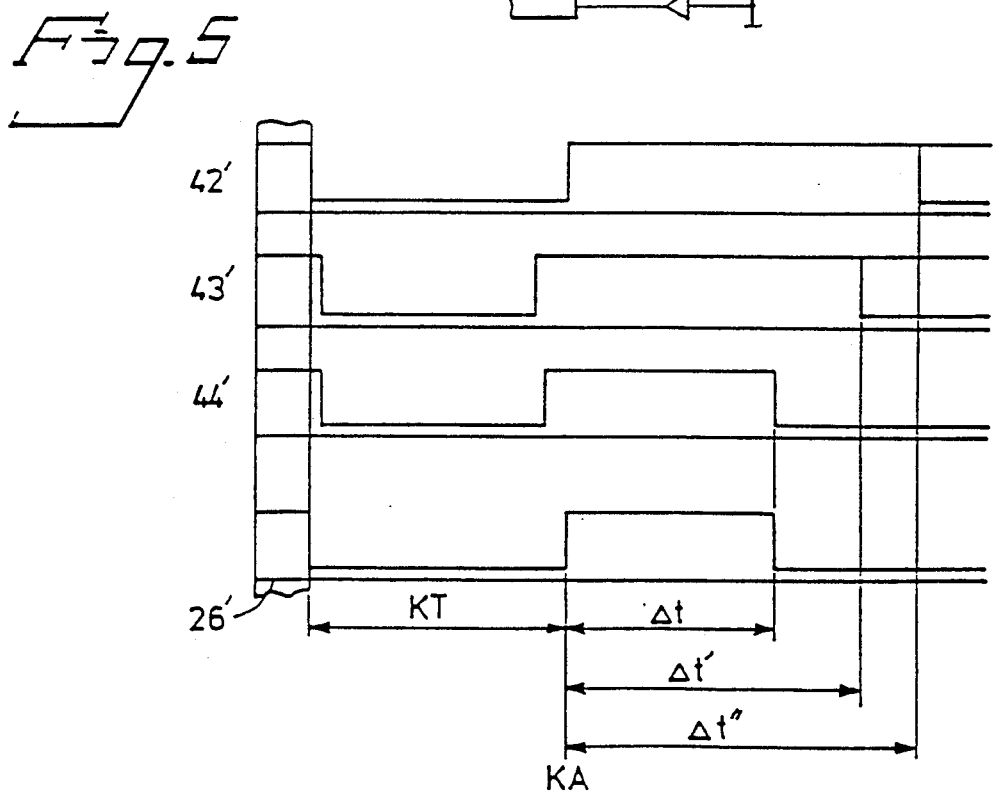

Fig. 4a

| 42 | | | 1 | 0 | 0 | 0 | 0 | 0 | 0 | 0 | |
| --- | --- | --- | --- | --- | --- | --- | --- | --- | --- | --- | --- |
| 43 | | | 0 | 0 | 1 | 0 | 0 | 0 | 0 | 0 | |
| 44 | | | 0 | 0 | 0 | 0 | 1 | 1 | 1 | 1 | |
| 26' | | START | B1 | B2 | B3 | B4 | B5 | B6 | B7 | B8 | |

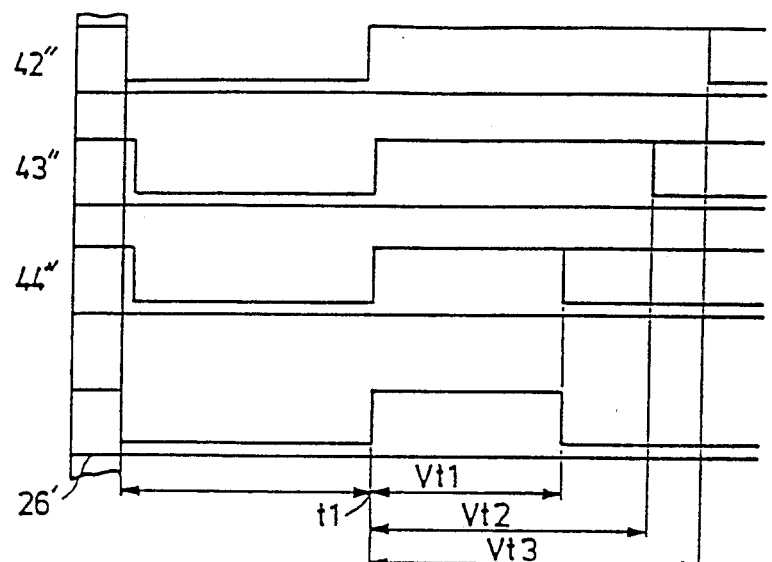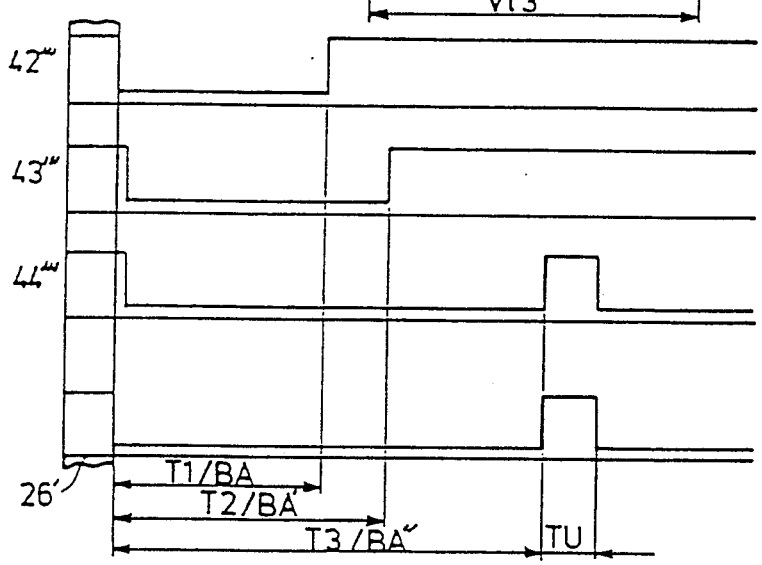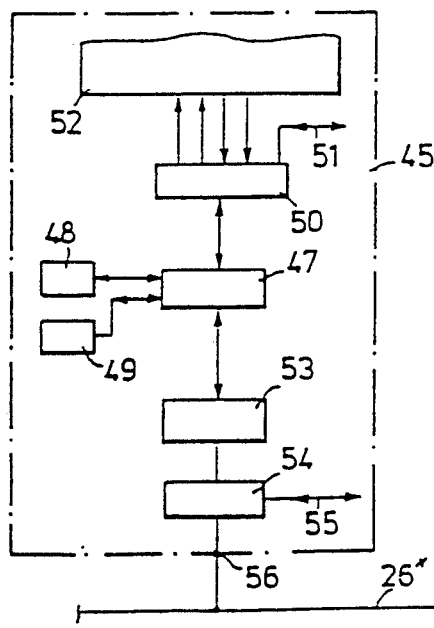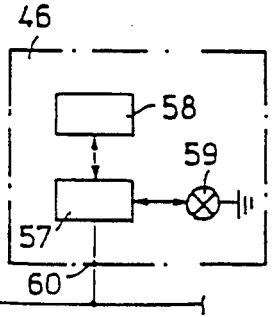

YARN TENSION CONTROL SYSTEM

FIELD OF THE INVENTION

The present invention relates to an arrangement for controlling and/or supervising, with the aid of a computerized system, a number of elements/functions forming part of a textile machine, weaving machine (i.e., rapier) functions being intended here in the first instance. For each element/function the system has one or more units, which serve the element/the function and which together with other units form a network in the system. One or more units in the system can moreover, if necessary, serve more than one element/one function.

BACKGROUND OF THE INVENTION

An example of functions which have to be controlled and supervised in a weaving machine is e.g. the tension in the yarn during the weaving procedure. The tension can be modified by means of yarn brakes with actuates the yarn frictionally. Spool shifts and changing over yarn feed elements is another example for controlling operations concerned with the yarn. A third example is operations for weft insertion, threading up, drawing in, etc. The invention is useful i.e., on and for weaving machines/i.e., looms of the type rapier (=gripper the term of (which is used below). In a weaving loom it is today typically necessary to be able to initiate 800-1200 picks/minute.

It is previously known to provide elements in a textile machine with a computer or microprocessor for control of functions or units.

The units exist in different types and variants and have to be capable of being applied to different types and variants of weaving machines. The electrical connection of the feeders to one another and to the controlling or supervising system of the weaving machine has hitherto been brought about in a different manner for each connection case. The connection is in general effected in terminal boxes in which a number of connection wires must be assigned their positions which are fixed for the connection case. There is a need for more standardized kinds of connection.

The weaving machine and feed elements represent a large number of functions which on the one hand have to be capable of being individually controlled and supervised and on the other have to be mutually interrelated to achieve an optimum functioning of the weaving machine. This means that the supervising and/or controlling system must be able to work rapidly and functionally reliably with e.g. short reaction times for yarn breaks, faults in the weaving pattern etc.

The use of a computerized system opens up the possibility of storing a large amount of information which can be used for the control and the supervision of elements/the machine. Signal-processing units, transmitters and drive units can be used in large numbers. A large range of different variants and solutions is offered to clients who wish to adapt their machinery according to the case selected for the occasion, which means that solutions which permit simple modifications of existing equipment are attractive.

Considering the large amount of information and the requirement for accuracy of the information, the transmission in the computerized system must take place accurately and with such speed that events which have occurred in the system are detected sufficiently rapidly in the places where the events which have occurred are to be acted upon in some respect. For each transmission case, the principle which applies is that a sequence of events is to be carried out. This sequence must in general be synchronized in some way, which can be achieved with the aid of, on the one hand, a run initiation signal (trigger signal) which gives rise to a certain sequence being carried out in the system, and, on the other, an acknowledgement signal which issues acknowledgement that an effected sequence is performed. In certain cases, an acknowledgement signal can be such that it directly initiates a new run. Alternatively, acknowledgements can be collected at a suitable place in the system in order to initiate a new run, taking as a starting point these together with some other criterion.

In order that the transmission be effective, it must have the following characteristics. The signal is to reach its destination within a stipulated time. Often it is a matter of a maximum permissible time between event and action, in which respect it can be of interest to know when the event occurs. In certain cases, therefore, time delays can be compensated. Another requirement is that the transmission must take place with high reliability, which means that the transmission must not be sensitive to interferences in the environment in which the equipment operates. The risk of faulty connection or faulty transmission must be minimized. The communication must also operate with considerable dynamics. Upon start-up and adjustment of the equipment before a determined operating state, relatively large amounts of data are to be transmitted but without any greater requirement for short times. The contrary can apply for synchronization signals in which there is no data, but only a message that the occurrence concerned is to be transmitted. A further requirement for making it possible for synchronization to be carried out in a rapid and effective manner is that the synchronization must be capable of being sent from or by all units concerned. The respective units concerned must moreover be capable of detecting the signal, as in many cases an event within the functional run of the elements or of the textile machine requires actions from a number of units.

The use of the new micro-electronics (computer technology) means that problems arise in collecting and reaching the different pieces of information at physical boundaries or interfaces. In order to connect the units together, electrical or optical lines are used for the signal transmission. The use of the textile machine and associated connectable elements is to a great extent dependent upon how the different controlling and supervising units are connected together with the connection concerned. A complicated machine has hitherto led to extremely complicated wiring. This has meant that reconstruction of a machine has not only been a matter of exchanging a lot of units, but it has also required extensive rearrangements of wires.

There is also a requirement to optimize the weaving function in the weaving machine so that even rapid weaving runs have gentle effects or stress on different parts in the weaving machine and/or feed elements. This means, inter alia, that actions, e.g. activations and stops, of certain parts and elements are to be capable of being prepared in advance so that sudden accelerations and decelerations are avoided or high speeds can be avoided.

It is also of great interest to anticipate and measure, in a rapid, effective and supervisory manner, the yarn consumption, which in individual cases is desired to be optimum with the least possible waste.

SUMMARY OF THE INVENTION

An arrangement according to the invention can be considered to be characterized principally, inter alia, in that each unit is connected or connectable to a connection which forms part of the network and at which message transmission within the system takes place and in that the respective element/unit/function is concerned with the yarn(-s)/weft(-s) path(-s) in the machine, gripper procetile, etc., in order to supervise and-/or control yarn(-s)/weft(-s) parameters as yarn(-s)/weft(-s) tension(-s), threading in/drawing in/.weft insertion, spool/yarn feed element shift(-s), etc.

In an embodiment the messages transferred between the different units in the mentioned network system can be ranked from the point of view of priority. A number of different instantaneous signals are used.

According the priority, different types of messages are transmitted with different priority. This is achieved, inter alia, by virtue of the fact that time-,critical messages are not obstructed by other less important messages. In one embodiment, each message is relatively short. An important message is therefore not obstructed by a long and/or unimportant message. In one embodiment, faults are detected in the transmission by the equipment with the aid of parity bits and control bits which form part of the message. Moreover, it is proposed that some form of confirmation be utilized. The hardware for transmission of data is designed to cope with an environment which is problematic from the electrical point of view. In one embodiment, optical transmission is utilized.

A digital communication protocol with standardized mechanical and electrical characteristics can be used. This opens up the possibility that any piece of equipment can be connected together with any other, provided that it satisfies standardization requirements concerned. In many cases, the connected equipment can thus be used directly only by it being necessary to make an addition in any central computer which configures the system. In other cases, it may be a case of modification in the respective connected unit so that this comprises the command which is transmitted on the network in a correct manner. According to the invention, a common type of connection is also proposed for all types of equipment concerned. An input and an output are thus obtained in which the variants are obtained by means of different encoding and interpretation of the serially transmitted data. An interface which is complicated in terms of hardware can thus be replaced with a single connection (inexpensive contact). The consequently more complicated data processing can be dealt with simply and inexpensively with existing modern micro-electronics. Connection :to or from other computer systems in or on the machine can be carried out without adjustment of the program in the supervising unit or main computer.

The prioritization proposed is based upon the fact that information is to be transmuted between the units. This transmission takes place via the serial connection and consequently means that an asynchronous process is carried out in time. Collision between simultaneous transmissions from the units must be avoided, which is achieved by prioritization. According to the invention, two logic levels are utilized at the connection, one of which is dominant and the other non-dominant. This means that, irrespective of how many of the transmitters transmit a bit which is non-dominant, a dominant bit will be received if a unit transmits a dominant bit at the same time. Another characteristic is that when a unit starts to transmit, this is detected by all connected units within a predetermined time. By these means, it is ensured that the digital levels of the communication remain stable at the moment when the units read off the bit from the communication. Each unit furthermore interrupts its transmission immediately when it detects that the transmission is occupied by one which is transmitting a dominant bit when the unit itself is transmitting a non-dominant bit.

In one embodiment, each unit can comprise a communication control part which on the one hand is provided with one or more first micro-computers and/or advanced digital circuits etc., and on the other is provided with or connected to a second micro-computer and/or advanced digital circuit etc., with the aid of which one or more of the functions of the feed element are controllable and/or supervisable. The different communication control parts of the feed elements can thus function together with one another and/or with one or more control elements (e.g. main computer) in the system via the digital and serial connection which thus functions as a data bus between the communication control parts or between the communication control parts and the control element(s).

The units thus comprise communication control parts with connection interfaces to, on the one hand, the connection, preferably two-wire, which functions as a data bus connection, and, on the other, microcomputers or equivalent which are divided up for control or supervision of the functions of the feeders. The serial bit flow effected by the communication control parts/the units at the serial connection proceeds in the form of messages which respectively comprise a frame and data part. Said frames comprise bits which are divided up for the transmission and reception functions of the system, e.g. for synchronization, encoding etc.

In one embodiment, the units can be assigned physical locations close to or on the respective device. The units or parts thereof, e.g. said communication control parts, are individually interchangeable with one another since they can effect control and/or supervision of a number, preferably all, of the functions of the feeders. The actual function/functions for the devices is/are thus selectable for the actual application.

A predetermined message type, which is attributable to the trigger signals and which is exchanged between the units/the communication control parts/the control elements has, at the digital and serial connection, priority over other messages which are attributable to the continuous operation of the feeders and/or the weaving machine. Exchange of a message belonging to the first message type takes place immediately after completion of exchange of a message of the second message type if such is available at the time of transmission of said first message. Furthermore, the bit speed is selected so that said short times for exchange of a message of the first type are available. Times within the range 0.1-1.0 ms are preferably used in this respect. Bit speeds of e.g. 1 MHz/sec can be used in the system.

In a further embodiment, the units/the communication control parts are responsive to one or more predetermined markings or addresses in said messages/- frames. In the event of messages/frames intended for a given feedwheel element, this receives and stores the message for action depending upon the content of the message.

The units can also work with a feedback function. Each unit can take care of the control function for the associated feed which can thus be provided with or interact with one or more transmitters which feedback stepwise or continuously a parameter change caused within the control function,,e.g. change in movement, state etc.

In a further embodiment, at the few-wire connection, information is effected from one unit to another unit, or from the control element (the main computer) which preferably forms part of the electronic system/computer system of the weaving machine. Said information can relate to control information or activation information, which in turn selects or initiates stored control information in the unit concerned, e.g. in its second microcomputer. With the aid of said control information the unit effects control action/control actions of associated feed elements. The control action/control actions can relate to a first control of the motor of the feeder element depending upon a weaving pattern which is programmed or selected in the electronic system/computer system of the weaving machine. Each control action can also relate to a second control of the motor of the feed element in relation to the motor/motors of other feed elements. Alternatively or complimentarily, there may be a third such control of the motor of the feed element, where preparatory acceleration and/or deceleration runs for the motor and part/parts influenced by it can be effected in advance so that the motor/the part/the parts are assigned their essential speed of motion before they come into operation for execution of an actual part of the functioning of the feed element in the weaving machine. Said runs can also be controlled so that exceeding the maximum speed or overspeeding can be prevented in the motor/the part/the parts.

The above proposals provide particulars relating to an effective integration and simple connection of the electronic control of the feed elements in or on the textile machine or to the supervising control system of the textile machine. The communications between the different functional parts in the textile machine or feed elements can be carried out rapidly and reliably. Units which work together can be connected and exchanged in the system without extensive reconnection or reprogramming. Thus, e.g. the feedwheel system can be connected easily and unambiguously to the weaving machine.

In an embodiment a yarn tension control system is proposed to give optimum yarn brakes functions.

In a weaving machine of the type raipier/gripper, projectile, etc. one or more yarn feeding paths are included. The yarn/weft of respective path is controlled and/or supervised by means of yarn/weft monitor device(-s) and/or control device(-s). One or more of the mentioned monitor devices is/are adapted to create a signal representative to the yarn/weft tension(-s) int the concerned path(-s). A unit receives respective signal and generates in dependence of the same one or more control signals when the operation parameter changes in one or more yarn/weft control device and/or the weaving machine and with that the yarn/weft tension(-s) can be changed or modified. The mentioned control signal are generated when the yarn/weft tension becomes below or above a predetermined tension(-s) and are fed to the mentioned device(-s).

The yarn/weft controlling device(-s) are adapted to interact with the monitor device(-s) and can decide the yarn/weft speed in respective path between the yarn spool and the yarn feed element. The speed is kept on a predetermined maximum rate value, which can be selected +/− 20% of the ideal value. A control unit which is included or is connected in and to the weaving machine is able to distribute control signals via the mentioned few-wired communication (for instance serial communication) to the yarn control device(-s) and or the machine in dependence of the excess of the maximum value.

Respective data unit (microprocessor) can include program selecting function(-s) and/or program receiving function(-s) in which a number of different operation applications of the machine are related to. By means of experience and/or calculations one or more programs can be simulated so that the yarn control and supervising device(-s) can be allotted a predetermined function(-s).

The brake/brakes can be controlled by one or more microprocessor which effects intermittent or continuous signal(-s) to respective brake in the duration of the respective pick of the weaving machine. The mentioned signal(-s) can be initialed from the weaving machine and/or mutually form the concerned feeders/yarn feeders.

BRIEF DESCRIPTION OF THE DRAWINGS

An at present proposed embodiment of an arrangement which displays the features characteristic of the invention is described below with simultaneous reference to the attached drawings in which:

FIG. 1 is a block diagram of a weaving machine with a system for control and supervision, to which a system for control and supervision of the feeders of the weaving machine is connectable via a digital connection for serial communication transmission which serves as a data bus connection, FIG. 2 is a diagram showing the format of a first type of message/frame which has priority over a second type or types of message/frame at the digital connection, FIG. 3 is a diagram showing the format of another type of message/frame which can appear in the digital connection, FIG. 4 is a block diagram depicting the connection of two units to the digital connection, FIGS. 4a and 5–7 are timing diagrams showing signal trains attributable to three different units, in association with prioritization when the units simultaneously require access to the connection, FIG. 8 is a block showing a different construction of units of the embodiment of FIG. 1.

DETAILED DESCRIPTION

Figure 9:
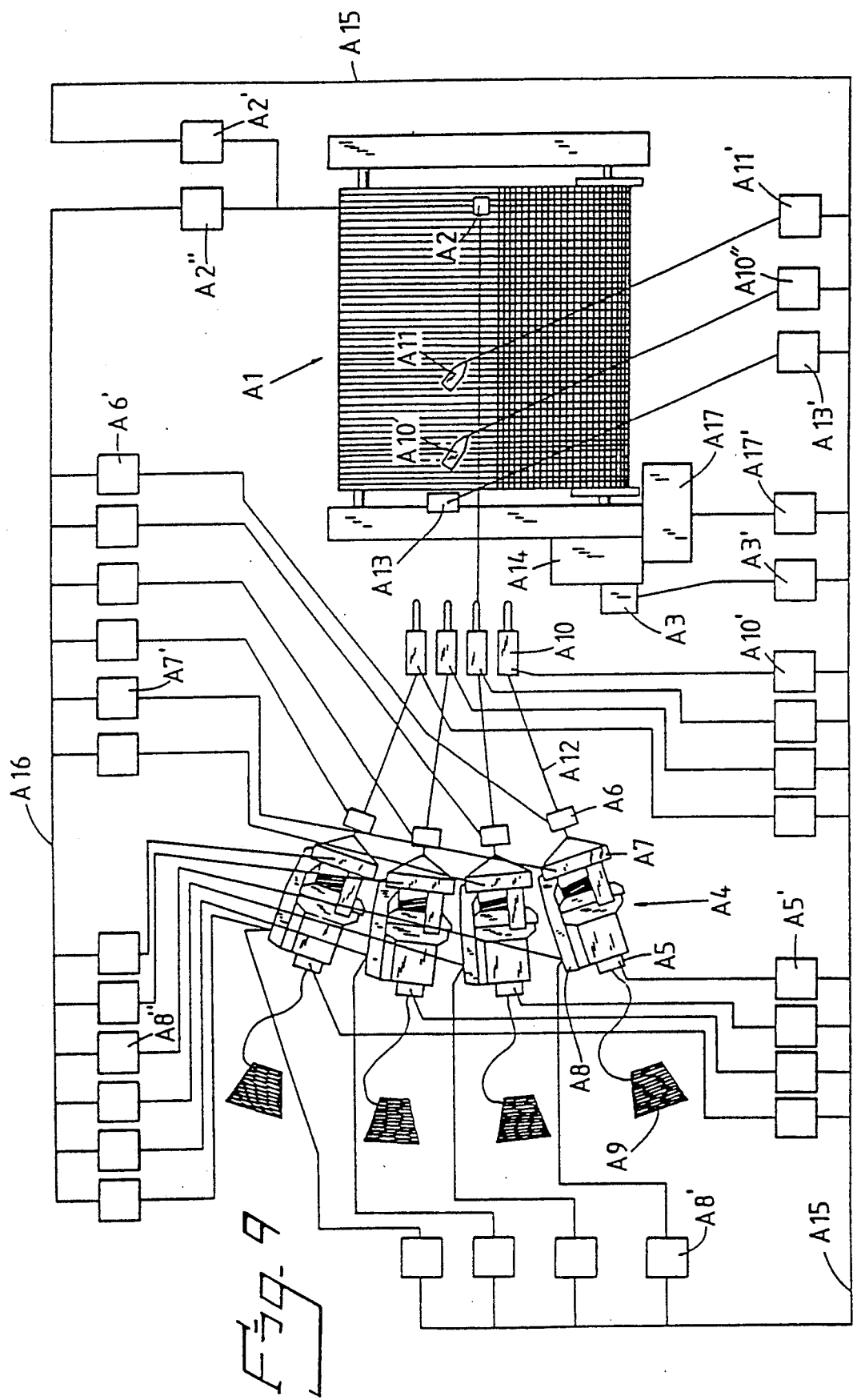
FIG. 9 is a diagrammatic plan view of a weaving machine and the connection of weaving machine functions comprising feeder functions served by computer system.

In FIG. 1, the reference number 1 represents a textile machine of optional type, e.g. weaving machine, knitting machine, shuttle machine, jet machine etc. The machine is of the type which is provided with a supervising electronic system/computer system 2, by means of which the different functions of the machine are controllable and supervisable. The connections of the system to the machine have been symbolized with 3 and the connections of the machine to the system with 4. The control and the supervision can take place in known manner and are therefore not described in greater detail here.

Feeders 5, 6, 7 and 8 are connected or connectable to the weaving machine. The feeders can also be of known type and are therefore not described in detail here. Thus, e.g. yarn magazines have not been shown for sake of clarity.

Each feeder has electrical connection parts 5a, 6a, 7a and 8a respectively, e.g. electromechanical parts. Each feeder is assigned a function control unit 9, 10, 11 and 12 respectively. In a preferred embodiment, each unit is physically located close to or on each feeder. Each unit comprises one or more first micro-computers or advanced digital circuits 13, 14 for serial interface control and serial bit flow processing. Memory circuit 15 (RAM, ROM) and a clock circuit 16 are also included. In addition, there can also be circuits for time logic, fault processing etc. In the figure, a communication port has also been shown with 17, via which port read-in and read-out elements can be connected via connections 18 for entering and retrieval of information, for programming etc. Each unit comprises or is connected to a second microcomputer 19 which effects the action, supervision etc. of the respective feeder. By means of the second micro-computer, calculations can be carried out for optimum control and supervision of each feeder via the connection 20. The second micro-computer comprises conventional peripherals such as memory circuits 21, communication circuits 22 etc. The connection interface comprises A/D and D/A circuits, communication terminals, pulse output etc. The second micro-computer 19 can be integrated in the unit 9 or alternatively constitute a separate unit, of the connection of the second micro-computer 23 to a separate communication control part 24 which has a corresponding construction to that described for the unit 9, apart from the second micro-computer 19 with associated peripherals 21, 22. The parts 23, 24 communicate with one another via a connection interface 25 for parallel communication. The units 9-12 can be constructed with identical, or essentially identical, connection interfaces so that individual interchangeability exists among the units, that is to say any unit can take the place of another unit, at least after a minor adjustment. In cases where a separate communication control part 24 exists in all units, these can be made individually interchangeable in corresponding manner.

Each unit 9-12 is arranged connectably to a two-wire connection 26, 27 for serial communication or message transmission. The system 2 is also connectable to the connection 26, 27. The system can comprise one or more control computers 28 which can function as supervising computer or computers for the units 9-12 which, in interaction with the respective control computer, function as slaves. In one embodiment the units 9-12 are complimentarily or alternatively arranged for reciprocal communication. Two-way or one-way exchanges of messages/pieces of information between the control computer/the control computers and the units or between the units is symbolized with arrows 29-38. Further connection(s) serving further units can be connected to the weaving loom computer system 2. The different computer systems can work in parallel or with a supervising and subordinate system. One or more units can thus be provided with more than one part 13, and each part 13 is connected to its part system or its loop (connection) which affects the unit in question. Two units which are connected via a connection, e.g. the main connection, can carry out internal communication with one another via the connection or the main connection, which internal communication is not involved in other communication at the connection (the main communication).

The respective connection of units and/or control elements to the digital connection 26, 27, which serves as a data bus, takes place via connection elements, e.g. terminal elements 39 which, for each unit/control element, have a pair of screws, via which the connection to the unit/control element or the connection 26, 27 takes place. Message exchange can take place with messages of different types. The bit flow, which is effected between the units or between the units and the control element(s), in the digital data bus is arranged in said messages which respectively comprise a frame part and a data part (applies to one type of message). The messages/the frames can be executed with markings or addresses intended for the units. Each unit receives and stores its addresses which are assigned in the system/the systems. Alternatively, the system/the systems can operate with a certain order for the units. In the event that the units are controlled from a supervising computer 28, the system can work with a start-up phase, in which control information is issued for selection of feeder functions, e.g. depending upon a programmed or selected weaving pattern, and a working phase in which the selected feeder function or functions are diagnosed, supervised, controlled for optimum function performance etc., and effected. Thus, e.g. the yarn quantity can be measured, the thread tension supervised etc. The reciprocal message transmission between the units makes it possible for the functions of the feeders to be related to one another, e.g. speed-adapted depending upon the type of weaving machine, possible yarn breaks etc.

The feeders can work with a feedback function/feedback functions where the system makes it possible for the feeders to utilize the same transmitter. The locking element function for the yarn measurement, retention and winding-off from the feeder drum can also be controlled.

Two or more message types can be utilized, one message type being given priority over other message types at the digital serial connection. FIG. 2 shows a construction of a first type of message which in principle consists only of a frame part (system part) which has the same length as the message 40, the length of which is indicated with L. The message or the frame is constructed of different fields. A start field is indicated with 40a, a priority field with 40b, a control bit field with 40c, a total control field with 40d, and finally an acknowledgement and completion field with 40e and 40f respectively. The content in the priority field determines the ranking of the message from the point of view of priority. In one embodiment, all messages appearing at the connection are mutually ranked, instantaneous signals or trigger signals being attributed the highest priority and normal communication then having priority according to the time requirement. Pick signals, yarn break signals, arrival signals, feedwheel exchange signal etc. have the highest priorities, while transmission of information regarding the long-term functional working in the textile machine has lower priority.

The second message type 41 according to FIG. 3 has, in principle, the same construction as the message type according to FIG. 2. The difference lies in the fact that the message in FIG. 3 also comprises a data field 41a. The frame part in message 41 according to FIG. 3 can be thought of as consisting of the parts 41b and 41c. The data field contains information which is to be transmitted between the units.

The communication transmission works bit-synchronously, which is of significance, inter alia, in priority selection. The messages are assigned relatively short lengths L and L'. In this manner, a message of lower ranking does not obstruct a message of higher ranking for any length of time in the event of transmission of the latter message taking place when a unit with a higher ranked message wishes access to the connection. The message length L' can be selected in the order of magnitude 0.05-0.1 ms (at 1 Mbit/sec). The distances a, a' and b respectively are selected with great accuracy. In order to carry out the functional working in the textile machine, bit speeds of e.g. 1 Mbit/sec or higher, e.g. 4 Mbit/sec, are utilized.

A basic feature of one type of transmission may be that two different types of logic levels are to be used, the first level here being called dominant level and consisting of "0" and the second level consisting of a non-dominant level "1".

By using said two levels, prioritization and fault detection are made possible. The hardware in the system is designed so that if one or more transmitters transmit a dominant bit or level, this will be received in the communication, irrespective of how many are transmitting a non-dominant bit or level. As a bit fault in the communication appears in all connected communication unit (units), 100% of all faults which have occurred are detected. This is based upon the fact that the transmitting unit sees that faults occur when the bit emerges in the communication. For faults which have occurred locally (that is to say faults which only occur in the receiving unit) the following conditions apply. If more than five bits are faults, detection of the fault takes place to 100% and this applies irrespective of how these five faults are spread in the message. A second condition is that if the number of faulty bits is odd, detection always takes place. As for the remaining types of faults (2 or 4 faulty bits), these are detected with a probability of 1/33000. The transmission of a bit is effected by means of the transmitted bit being divided up into five parts. The first part is a synchronizing part which normally starts the bit. The second part consists of an increase part (time increase part), with which the bit is increased in the event of resynchronization. A third part relates to a first delay part which is attributable to a time interval, during which a stable level is obtained. At the end of this time, the value of the bit is read off. The fourth part consists of a second delay part, which forms a time interval in order that the circuit may determine internally whether it is the current unit which is to transmit the coming bit and which bit is to be transmitted in such a case. The fifth part is attributable to a reduction part which can be removed in the event of resynchronization. In cases where the communication part concerned cannot work entirely alone, it can be complemented with a microprocessor.

In one embodiment of the invention, all units which want to have access to the connection start to transmit their message as soon as there is a free space at the connection. The different messages have different priority, which means that all messages with lower priority are interrupted and only, the message with the highest priority comes to be completed. All those connected to the connection can, however, read the transmitted message. All units are adjusted or arranged to receive an assigned message and pick it up and, depending upon the message, carry out the function in question or pick up an actual piece of information. Acknowledgement can take place in different ways. A receiving unit can e.g. transmit an acknowledgement bit when it considers it has received a correct message. Another possibility is that the receiving unit answers by means of transmitting a message back depending upon a received message. The receiver can alternatively transmit a special acknowledgement message.

By means of the prioritization function proposed according to the invention, the transmission of a large amount of information between the units is made possible. The transmission consists of an asynchronous process which has to be carried out serially in time. The units do not then receive knowledge in advance of the message transmission happening. The system therefore has to work so that collisions between two different messages are prevented. According to the invention, it is proposed in one embodiment that prioritization takes place in the transmitted message, which means that any unit can transmit to any unit without problems. In addition to the system thus working with two logic levels, all connected units must be capable of detecting within a fixed time when a unit starts to transmit. By this means, it is ensured that the digital levels in the communication can be made stable at the moment when the units are reading off the bit from the communication. Another requirement in a system of this category is that each unit must interrupt its transmission as soon as it detects that the transmission comprises a message with a dominant bit when the unit itself is transmitting a non-dominant bit. Further action can be taken to ensure that a unit with high priority does not fail to transmit. In normal cases, the transmitting units start their transmission in a random manner in time, which makes it extremely improbable that two units start to transmit simultaneously (they have to happen to start the transmission within the same 100-300 ns at a bit frequency of 1 MHz). In the event of transmission taking place simultaneously within this time, the selection is made by means of prioritization. The problem arises when the transmitting unit cannot transmit because the connection is occupied. When the connection becomes free, the probability is very high that there will be several messages waiting in turn to transmit. When the network becomes free, all those which are waiting in the queue can start their transmissions, in which case there is also the requirement that when a message is completed, all units which wish to transmit must start their transmissions in an interval which is approximately 10% of the bit period, which means that all units must start their transmission within the same 100-300 ns at a bit frequency of 1 MHz. This latter requirement is prescribed preferably in order that a unit with low priority does not start transmitting somewhat earlier than one with high priority and thus create an occupied connection. The above can, however, be used for prioritization. A manner of ordering priority is thus that after a completed message, the units receive different delays before they can start the transmission. The unit which has the highest priority has a short waiting time and those with low priority have to wait a long time before they can transmit.

The waiting time with normal use of the connection with a maximum transmission speed can be 148 μs ($2 \times 111$ bits) plus the time it takes for the processor to process the information with its program. The minimum transmission time is half of the maximum. By means of only allowing, at sensitive moments, transmission of messages without data, this time can be reduced to 62 μs. All these calculations are made with a bit frequency of 1.5 Mbit/sec and on the assumption that the transmitted message has the highest priority. The circuit has the possibility of interrupting a transmission by transmitting a fault frame, which is transmitted automatically when faults are discovered in the communication and all units interrupt the reading-in and disregard all information read in. By transmitting such a signal, the message in progress can be interrupted and an important message can be transmitted directly afterwards. This should reduce the response time to a maximum of 44 and a minimum of 40 μs.

For messages which comprise a predetermined number of bits with the same level in succession, the transmission (the protocol) works with a bit which is inverse and follows the predetermined number (e.g. 5). The inverse bit can optionally be selected to form part of the mess„ge or not. Interference is thus prevented from locking the connection. Otherwise it would be possible for cases to arise in which the interference was repeated and the system went out of order. In the event of faults, all units transmit e.g. six dominant bits in succession as a sign that they have perceived the fault. All units then transmit e.g. six non-dominant bits. With this, the communication is restored and each unit is ready to or can start transmitting. Each unit which received the faulty message discards it and the unit which sent the message from the start resends. By these means, speeding up of alarm messages is brought about.

FIG. 4 shows the connection in principle of three units 42, 43 and 44 to the connection 26. Table 1 below shows how the priority selection is arranged in a first example. The construction of the priority field in the respective message for the respective unit 42–44 can be seen in the table. The message of the unit 44 has most dominant bits (levels) and is selected before the messages of the units 42 and 43.

TABLE 1

| | priority filed | unit |
|---|---|---|
| Transmitted: | 1000 0000B | 42 |
| | 0010 0000B | 43 |
| | 0000 1111B | 44 |
| Result: | 0000 1111B | 44 |
| | ⎰ 43 has transmitted 1 but received 0 and stopped its transmission | |
| | ⎱ 42 has transmitted 1 but received 0 and stopped its transmission. | |

FIG. 4 shows that the unit transmits its respective bits and reads the levels (that is to say, transmits and reads simultaneously) which are received on the common communication line.

FIG. 4a shows the case according to the table shown above where prioritization takes place in one part of the message. In the figure, a "1" indicates a non-dominant level/transmission and a "0" a low level/dominant transmission. The transmission at the respective connection must be so rapid that when the respective bit is read off by the receivers/the units, all the transmitted bits must have reached the respective receiver. B1, B2, etc. to B8 indicate respectively a bit space. When the unit 42 compares the transmitted bit in the space B1 with the state received in the communication, the unit notes that the non-dominant bit has been overwritten by a dominant one. The unit therefore interrupts its transmission. This must take place since continued transmission of the bits of the unit would have rendered impossible the prioritization by means of overwriting of the dominant bits of the unit. At the bit space B3 the unit 43 makes the same observation of the difference between the transmitted bit value and that which the unit sees in the communication, for which reason the transmission is interrupted. At bit space B8 the unit 44 notes that it had the highest priority since it never had to interrupt its transmission. The unit 44 consequently completes the message. The transmission (the message) can of course consist of both ones and zeros even though only zeros are shown in the exemplary embodiment. In the example described, the prioritization process takes place with the aid of eight bits. It is of course possible to use more or fewer bits.

FIG. 5 shows an alternative case with collision detection known per se. The units 42', 43' and 44' are assigned different waiting times $\Delta t$, $\Delta t'$ and $\Delta t''$ after collision. The unit (42') which is assigned the longest waiting time ($\Delta t''$) receives priority at the connection, whereas the other unit(s) must thus wait for their respective transmission.

FIG. 5 also shows the signals which occur in a system in which three transmitters/units collide in their attempts to transmit simultaneously. The units/the connection are normally executed so that no unit starts its transmission when another unit is transmitting. In the event of a simultaneous start, however, there is a slight risk of a respective unit not managing to detect that another is transmitting simultaneously. After a moment or a shorter time interval, the transmitting units/circuits come to indicate that their transmission is colliding with another transmitter. When a transmitting unit detects this, it goes into a fault detecting phase in order to complete the message and indicate to other units that the transmission has collided. The completion is carried out in such a manner that all units involved transmit a sequence of dominant bits which overlap one another so that by these means a clear and marked completion of the collision can be detected by all units which are all synchronized to the edge in question. From a time KA, all units wait a predetermined time and the unit with the highest priority waits the shortest time before the unit starts to transmit. The units with lower priority wait a longer time and, when the time comes at which the latter units are to start to transmit, they indicate that the connection is occupied, for which reason the units concerned have to wait until the communication becomes free.

FIG. 6 shows a further alternative concerning mechanically guided collision in which dominant levels are first transmitted in order to make clear that the unit(s) wish to transmit. The units 42'', 43'' and 44'' are assigned different wait times vt1, vt2 and vt3 after all units have finished transmitting dominant bits. The unit (42'') with the shortest wait time (vt1) thus gains priority to the connection. The edges of the pulse trains must be kept to the time t1 with great accuracy (e.g. 100 nanosec).

The case according to FIG. 6 is almost identical with the case according to FIG. 5. The functions differ in that the units in the case according to FIG. 6 do not start to transmit any message without starting by transmitting the sequence which in the case according to FIG. 5 indicates a collision. A collision is thus signalled irrespective of whether any other unit is transmitting or not. The prioritization otherwise takes place in the same manner as in the case according to FIG. 5. The advantage with the method according to FIG. 6 is that the delay is constant and the collision indication does not need to be carried out. The disadvantage in relation to the case according to FIG. 5 is that the prioritization takes a certain time even if there is only one unit which is to transmit.

FIG. 7 shows a fourth example of priority selection for the units 42''', 43''' and 44'''. In this case, the starting point is the number of bits BA, BA' and BA'' or times T1, T2 and T3 respectively in the respective message. The message for the unit (44''') with the greatest number (BA'') receives the transmission state.

In this solution, it is the start sequence itself which is used for the prioritization. In this case, the length of the start sequence varies and that which has the longest start sequence and is the last to stop with its start sequence has the highest priority. After the prioritization, a certain time TU is used up for the unit to clarify that it is itself which is to transmit. The different prioritization times T1, T2 and T3 must be so different in length that they can never be mixed up with one another. There is in this case a degree of uncertainty in time, since the time from the time a transmitter starts to transmit until the start edge concerned is detected by other units.

FIG. 8 shows examples of units 45 and 46 of different types, the unit 45 being highly intelligent and the unit 46 being of a simpler type. The unit 45 has a microcomputer 47 which is connected to or comprises memory areas 48, 49, e.g. in the form of RAM or ROM memory respectively. The micro-computer 47 works into a connection interface 50 which comprises D/A and A/D converters. Also included are counters, pulse outputs and pulse inputs. The connection interface 50 can also be provided with a communication terminal 51. The connection interface works into an electromechanical part 52 belonging to an actual element in the textile machine. The microcomputer 47 also works into a communication part 53 which can comprise one or more micro-computers, advanced circuits etc. A circuit 54 which in particular configures the unit 45 can be included. Said circuit 54 is provided with inputs and outputs 55. The unit 45 is connected via an output 56 to the digital connection 26''. The unit 46 can consist of a communication part 57 which is connected to one or more transmitter elements 58 and one or more indicator elements 59 and/or execution elements 59'. The unit 46 has an output 60 which is connectable to the connection 26'.

FIG. 9 shows symbolically, with AI, an airjet weaving machine with A1. The machine is provided with arrival detectors A2 and reference transmitters A3 for the machine angle. A number (4) of feeders A4 belong to the machine. Each feeder is provided with inward and outward thread monitors A5 and A6. A thread measuring device A7 and motor control elements A8 are also included. The respective yarn stock is indicated with A9. Each feeder is assigned a main nozzle A10 and relay nozzles are indicated with A10' and A11 and the thread with A12. Cutting elements A13 are also included. The drive element of the weaving loom is symbolized with A14.

The machine is controlled and supervised by two computerized systems according to the above. The serial digital connections in each system are indicated with A15 and A16 respectively. The computerized or electronic control system of the weaving loom is indicated with A17.

Said elements forming part of the weaving machine are connected to the respective connection via units according to the above. The units have the same reference indications as their associated elements, but completed with primes. Only the units whose elements are provided with reference indications are marked with the corresponding references. Similar elements (e.g. main nozzles for each feedwheel) each have their own unit in the figure, but elements can share the same unit or be connected in pairs to the same unit. Other units (e.g. motor control elements A8) can on the other hand be connected to two units A8', A8'' which each belong to or are connected to their own of the two computerized systems. The control unit A17 of the machine is connected via the unit A17' and the call monitor A2 is connected to both systems via the units A2' and A2''.

The equipment according to FIG. 1 works with a start-up phase and an operation phase. For the start-up, each feeder has e.g. been assigned an identification number in the system. This allocation can take place by means of a code being received in the terminal contact. The start-up phase in the system can be characterized by the following description. The respective feeder reads off its identification code via the communication transmission effected at the respective connection from a supervising unit in the system. The weaving machine informs the system of its breadth and working speed. The weaving machine further informs the respective feeder of the coming pick sequence number, e.g. 16, for the machine speeds most closely corresponding to the number. The weaving machine also informs the respective feeder of how much time will run after the reference signal before the feeder releases the thread. The respective feeder prepares itself with the aid of this information by taking up an optimum thread stock and adjusting itself to optimum maximum speed.

The operation phase is started by the weaving machine giving a start signal to the system(s). Every time the reference transmitter A3 is passed, a reference signal is issued. The feeder whose turn it is to release thread, counts down the time until the release time. When the latter is reached, the feeder releases the thread. The feeder also measures the thread and activates its stop element at the right moment. The arrival monitor A2 gives a message when the thread passes. Thereafter, the sequence is repeated, reckoned from the reference signal of the reference transmitter. The repetition depends upon the length of the sequence. In one embodiment, the sequence can be repeated a further seven times. Thereafter, the weaving machine gives a pick sequence of a number of picks, e.g. eight picks, which are to come after the remaining picks, in this case eight picks, which have already been given. Once again the sequence is repeated from the stage at which a reference signal is received when the reference transmitter A3 is passed. In the described operation phase, different types of message according to FIGS. 2 and 3 are thus called for. The start signal of the weaving machine is a typical instantaneous signal/trigger signal. The signals from the reference transmitter, the activation signals of the feeders for the stop elements, and the signals from the arrival monitor are typical instantaneous signals. These signals have, according to the above, priority in the communication transmission system over messages which contain data parts. An example of this message type is speed information and other messages which are to go to the respective feeder. These messages can be stored in memory stacks which work on the first-in-first-out principle. The yarn quantity e.g. can be directly received in these messages.

An alternative embodiment of a functioning principle which can be utilized on the weaving machine according to FIG. 9 starts out from the fact that the system is equipped with separate nozzle control which controls main and relay nozzles A10, A10' and A11 respectively. This nozzle control is thus connected to the same serial communication as the weaving machine and the feeders. The start-up stage is started by the respective feeder A4 reading off its identification code in communication transmission. The weaving machine indicates its breadth and its working speed. The weaving machine informs the respective feeder of the next pick sequence (e.g. 16) for the machine speeds most closely corresponding to the number (16). The respective feeder prepares itself with the aid of this information by taking up an optimum thread stock and adjusting itself to optimum maximum speed. The weaving machine (by means of its part A17) asks the respective feeder A4 how long after a release signal the feeders is to release the thread. The respective feeder informs the weaving machine of how long it takes from the release signal being received to the feeders releasing the thread. The weaving machine stores these values in order to be able in each operating case to calculate an optimum time for transmitting a release signal to the actual feeder. The weaving machine instructs the respective feeder to indicate every time a certain length, e.g. 7 cm, has been unreeled. This information is read off simultaneously by the nozzle control.

In this case also the operation phase is started by the weaving machine giving a start signal. The respective feeder calculates and executes optimum acceleration and speed sequences. The reference signal is given when the reference transmitter A3 is passed. The weaving machine calculates an optimum time for giving a release signal to the feeder which is to release thread and an optimum time for transmitting a message to the nozzle control to turn on the main nozzle. At the correct time, the weaving machine transmits a message for opening the main nozzle and a release signal to the actual feeder. The main nozzle is opened and immediately thereafter the feeder releases the thread. The feeder measures the thread and transmits a situation signal every time 7 cm of thread have been unreeled. Guided by this, the nozzle control calculates optimum times for opening and closing relay nozzles and closing off the main nozzle, in addition to which the nozzles are controlled according to this. The feeder calculates the correct time for activating its stop element and activates the stop element when the time comes. The arrival monitor A2 gives a message when the thread passes. Each element can, guided by the procedure, conclude whether the pick has been successful or not. If the pick is judged to be faulty, a message concerning this is transmitted. The weaving machine decides whether it is to stop or continue. The above sequence, reckoned from the respective feeder calculating and executing an optimum acceleration and speed sequence, is repeated a further 7 times. The weaving machine gives the pick sequence of eight picks which come after the remaining eight picks which have already been given. Repetition takes place again of the whole sequence from the phase in which the respective feeder calculates and executes an optimum acceleration and speed sequence.

For the cases described above, in the event of thread break before a feeder, the feeder in question transmits a message code (instantaneous signal) "thread break before feeder" and completes its pick. The weaving machine takes suitable action for the system. The feeder informs the system whether the pick has been completed or not. In the event of thread break after a feeder (A6), the feeder in question transmits a message code (instantaneous signal) "thread break after feeder". The weaving machine takes suitable action for the system. The invention proposes controlling operations for yarn-/weft brakes adapted in connection to or in (yarn) feed elements. The brakes can have an uncomplicated or complex structure, In an embodiment the tension of the yard/weft is, in the running-on procedure of the yarn-/weft, proportional to the speed of the feed element. The tension is very low at the start of the feed element, which causes problems especially in the case where the spool body lacks of yarn separation. In this latter case the yarn in itself urges forwardly the yarn windings/yarn reserve on the spool body in the running-on procedure. For the most proper operation it is necessary to have a minimum tension in the yarn and at low feed element rates it is necessary to brake the yarn by means of a brake at the entrance side. The known yarn brakes are in continuous contact with the yarn, which imparts an inexpedient load on the yarn when the feed element runs with a number of revolutions higher than that number of revolutions necessary to keep the enough tension for feeding the yarn reserve forwardly on the spool body. The subject invention proposes intermittent brake operation(-s). In a first embodiment the operation of the brake is simple. The control, device controls two positions or conditions of the brake which operates with a braking position and a non-braking position. The trigger signals in the system of the present invention are applied to the (yarn) brake/brakes which are actuated in dependence on the trigger signal from the system.

The serial protocol proposed by the present invention allows controlling of more complex brake functions than that mentioned above. According to the present invention, it is proposed to control a yarn brake on the exit side of the feed element. Such a brake regulates the yarn/weft tension during the pick time. For instance, in gripping machines (looms) there is a need for a specific minimum yarn tension when the grip device catches the yarn. In the known machines/looms the tension has a constant value like the above-mentioned brake on the entrance side. It is difficult to set the brakes for optimum tensions. The set value differs from one type of machine to another. Even the machines which in the same company are used for producing the same products have in practice different settings. The characteristics of the brakes vary also in time due to variations in temperatures, deposits, etc.

The present invention is applicable on different kind of brakes. In a first type of brake, the yarn slides a certain angle on a cylindrical surface. The braking force is attained from the following expression:

$$F_{ut2} = F_{ut1} * e^{\mu \alpha}$$

$\mu$ = coefficient of friction
$\alpha$ = angle.

This first type of brake strengthens or amplifies the incoming tensions which in many cases is a disadvantage. In a second type of brake ("leaf-brake"), the braking force is attained from the expression:

$F_{ut1} = \mu F +$ force in yarn in front of the brake.

This type of brake is not sensitive to incoming disturbances, which however pass through the brake. By combining the principles of the first and second types of brakes it is possible to obtain an advanced controlled brake, see FIG. 10. The first type of brake is applied on a conventional LAT motor Mt (Limited Angle Torque motor) the axis of which is movable a predetermined angle, for instance ±90°. This type of motor is very fast and is readily available on the market. The angular acceleration can be for example about $10^5$–$10^9$, preferably $10^7$ rad/s². The motor effects a given moment M in a certain angle $\beta$. The value of the moment or torque is related to the force in the following expression:

$$F_{ut2} \approx M/(r * \sin(\beta))$$

The force $F_{ut2}$ can be linearly proportional in relation to the applied moment M if the force F is fed back in a way to keep the angle $\beta$ constant. By varying the moment M under the pick it is possible to control the yarn tension under the pick duration. The invention also offers the possibility for varying the moment M with the angular speed $\beta'$, by means of which dynamical factors can be compensated. It is also possible to apply a negative moment -M at the same time the force F is released. The yarn tension can in such a way rapidly be decreased to a minimum. The angle ($\alpha = 60_1 + \alpha_2$) is dependent of the angle $\beta$ so that the system can be designed for a very rapid response. In such a way the disadvantages of the first type of brakes have been changed into advantages in the combined brake.

The combined brake (FIG. 10) has a microprocessor mP (functional control unit) of its own and gets or exchanges data information from or with the weaving machine Z via the communication 26, 27 (see FIG. 1). The first signals are related to a first value of the friction coefficient $\mu$ and set up a table (F2) for the desired yarn tension $F_{ut2}$ as a function of the angle of the weaving machine in the weaving cycle. The tension control system is able to give the machine information about actual value of coefficient $\mu$, difference in thread thickness, etc., the value of which can be calculated from the measured values of the moment/torque M (M1 and/or M2) and angle(-s) $\beta$, $\alpha$, said value of the moment M can be calculated from or determined by means of the motor current(-s).

Figure 10:
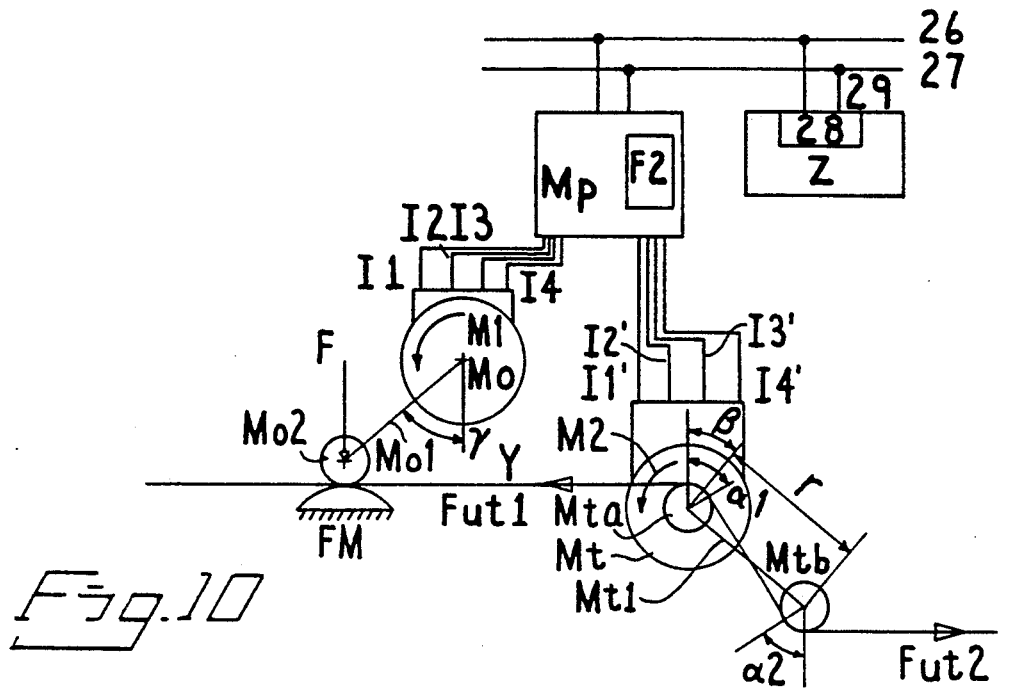
FIG. 10 shows principally a first embodiment of a yarn breaking or a tension control system.

Second signals are suitable to indicate the angle of the weaving machine. At least one signal is needed for each respective turn and this signal is of the trigger type signal. When several signals per each turn are used in the turn indication, for example four signals, all the signals are to be trigger signals (first signals). A modern ordinary weaving maching of gripper type works typically with a number of revolutions of 600 r/min, i.e. 10 Hz. The yarn is drawn in under (about) half a turn and the yarn rate varies approximately sinusoidally with two half periods at the frequency of 20 Hz. The brakes according to the present invention are adjusted coarsely with at least 200 Hz and smoothly (superposingly) with 2 kHz, which presents good characteristics for the control operation of the brakes. It is realized that the trigger signals (first signals) have to operate with delay(s) (well) below 2 ms (corresponds to 500 Hz). In FIG. 10 Mo is a torque motor which effects moment/torque M1 on its axis or rocker arm Mo1 which is provided with or connected to member Mo2, which be rotatable or fixed. Moment M1 causes a force F against member FM, which is preferably fixed. Yarn(-s) Y run(s) between members or brake elements Mo2 and FM which cooperate to form a yarn brake, and force F causes the desired friction for the yarn. Angle $\alpha$ is the angle of axis Mo1. The motor Mo is controlled by microprocessor (unit) mP including table F2. Line $I_1'$ transfers an actual value signal for angle $\alpha$; $I_2$ a reference value signal for angle $\alpha$; $I_3$ an actual value signal of moment $M_1$; $I_4$ a reference a referens value signal of moment $M_2$.

A motor Mt has a wheel or a first frictional yarn contacting member Mta Member Mta can alternatively be separated from the axis of Mt and is then preferably fixed. Motor Mt provides moment/torque M2. A second frictional yarn contacting member Mtb is related to Mt via a rocking lever Mt1 in such known way that member Mtb is rotatable around the axis of Mt with preferably fixed centrum distance r between members Mta and Mtb. Turn angle or angular displacement is shown by said $\beta$. The members Mta and Mtb are preferably provided with cylindrical envelope surfaces around which yarn(-s) run(-s). The surface or member Mtb is preferably not rotatables relative the yarn(-s). The yarn(s) is/are in frictional engagement with parts of said surfaces. Said parts are indicated with $\alpha_1$ and $\alpha_2$ the line $I_1'$ transfers an actual value signal for angle $\beta$; $I_2'$ a reference value signal for $\mu$; $I_3'$ an actual value signal for $M_2$. By means of said values (signals) the motors Mo, Mt or rather the moments $M_1$, $M_2$ can optimally controlled. When the friction of the yarn(-s) is high at said surfaces the friction at members Mo2 and FM can be decreased and vice versa by feeding over the friction status from the one friction effecting point to the other and vice versa, The combined yarn control system can effect the right/optimum yarn brake operation during the weaving procedure(-s). The tension control system works with an inherent friction measuring function. The yarn tension system can be used separately in relation to the equipment describe by means of FIGS. 1–9.

The reference values are calculated by the microprocessor in concert with the table F2 and the actual values of angle $\beta$ and the currents which correspond to the moments M1 and M2.

The above-mentioned mathematical expressions are valid for fixedly arrangement of members Mo2, Mt1 and Mtb. The friction surface of materials such as said friction members have friction layers of diamond, metal, metal oxide, ceramics, etc. having enough friction coefficients, are able to conduct heat away, are durable against wear, etc.

The above tension control system is intended for adaption at the inlet or outlet side of the concerned feeder(-s). The yarn(s) path(s) is/are running from the left to the right in FIG. 10. A change in tension Fut2 causes changes of angle $\beta$ against the torque $M_2$. The control system responses very fast to the tension change and is able to take a condition/position which in each moment is balanced against the each occurring value of the force Fut2.

The invention is applicable to weaving machines/-looms provided with automatic threading up (drawing in) function and with weaving in one colour and two feed elements in so called weft mixture, i.e. in each second pick the respective feed element is actuated for feeding.

In the automatic threading up procedure the following sequence is possible:

1. The yarn feed element 1 indicates a yarn break before the element and send the message "Yarn break at the entrance side of the feed element" (the indication is of the type trigger signal=first signal).

2. The loom instructs the feed element 2 "Double up the yarn supply" and is after that supplied from the feed element 2 which works with the double frequency.

3. The loom instructs the thread up system "Change yarn".

4. The thread up system advises the feed element 1 "The spool body is to be emtied" and clears out the same.

5. The thread up system applies the new yarn at the inlet of the feed element 1 and instructs the same "Soak or blow through the yarn".

6. The feed element soaks or blows the yarn through and informs the thread up system "The yarn is in right position".

7. The system grips the yarn and informs "The yarn is gripped".

8. The feed element winds up yarn on the spool body and indicates "Ready".

9. The system carries the yarn end to a position in which the yarn end can be gripped by the yarn guide and informs the loom "The yarn is ready to be received".

10. The loom receives the yarn and instructs the feed elements "Return to double shift".

The messages transferred on the communication in items 1–10 are not very critical from the view point of time but can be interleaved between the trigger signals. The procedure described in 1–10 can be effected by means of fewer signals and steps and is shown only as an example. Instead of the communication with the machine the feed elements can take and exchange information(-s) from respective with each other in the procedure. If the system includes automatic spool shift devices further message can be distributed and received as following:

11. The spool shift device informs the weaving machine "The yarn on feed element 1 is finished".

12. The weaving machine and the feed elements exchanges messages in accordance with items 2–10 above.

A weaving machine works with one or more yarn feeding paths are conducted via yarn feed elements, yarn brakes and monitor(-s) for the yarn. The yarn feeding operation(-s) are data controlled and include data units (microprocessors) which are mutually connected via a few-wired communication (serial communication). The brakes, feed elements, monitors, etc. include programs which control respective operation. The feed elements are adapted to be controlled by the units so they work with optimum yarn reserve/store. The brakes are adapted to be controlled by their unit(-s) so they effect controlled yarn tension(-s) at the inlets and outlets of the feed elements. In an embodiment the monitor device(s) effects real indications of speed changes in the yarn(-s) so that respective monitor device does not indicate yarn break at said speed changes. The brakes effects, in dependence of the control signal from the unites, a predetermined low (optimum) speed which effects an even tension on the (spool) body. The feed elements and the brakes effects small speed changes in the yarn feeding paths between the spool and the feed element. The yarn store range on respective feed element can be checked controllably.

A data communication connection with a few wires can be utilized. In one embodiment, with a few wires means a connection with e.g. two wires/conductors for the signal transmission and access to earth (earth conductor) and a screened conductor which prevents interference into and out of the system. Two-wire is to be read with these conditions as the starting point.

Figure 11:
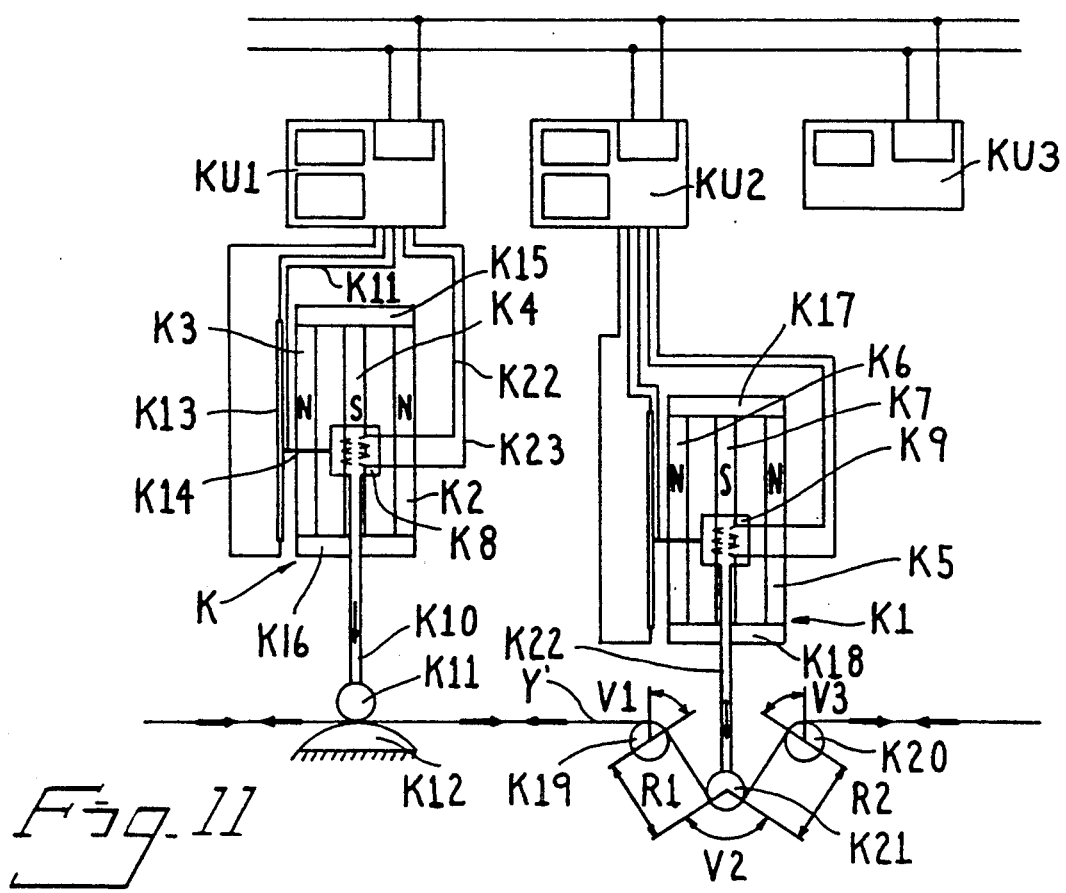
FIG. 11 shows principally a second embodiment of a braking or tension control system.

FIG. 11 shows a yarn/weft tension control system comprising linear motor devices K an K1. Respective device comprises a permanent magnet arrangement including elongated iron (core) members K2, K3, K4 and K5, K6 and K7. A movable coil (winding) member K8, K9 is guided on member K4 respective K7 and is movable in the longitudinally direction in relation to said member K4, K7. Members K2, K3 and K5, K6 are north magnetic poles and member K4, K7 is south magnetic pole. The movable coil is attached to or provided with actuating member K10 which includes member K11 which urges yarn Y' against support in order to cause frictional engagement for said yarn. The coil member K8, K9 has or interacts with a sensor arrangement for indicating the displacement position of the coil on core member K4, K7 and then the displacement position of member K11 in relation to support K12. The sensor arrangement includes a potentiometer which is interactable with shunt member K14 attached to the movable coil. By means of the arrangement the value of a signal Ki1 is dependent on the displacement position of the coil in relation to the potentiometer. The signal Ki1 has its lowest value in the lower coil position in FIG. 11 and its highest value in the highest coil position. The permanent magnet, which includes also core or iron members K2, K3, K4 respective K5, K6, K7 and further core or iron members K15, K16 and K17, K18, effects a magnetic field, in which coil member K8, K9 is displacable in the length direction of elongated member K4, K7 by means of signals (currents, direct currents) Ki2, Ki3. The first of the latter signals/currents causes upward movement of the coil member and the second signal/current downward movement. Alternatively, the movements are determinable with current directions.

Linear motor device K1 operates in the same way as device K. The yarn Y' runs over three Cylindrical members K19, K20 and K21, the latter one is applied on arm K22. The yarn engages the members K19, K20 and K21 at angles V1, V2, and V3. The of these angles depends on the relative displacement between members K19, K20 and K21. In the shown embodiment member K21 is displaceable in relation members K19, K20. The members K19, K20, K21 (and also K11 and K12) can be provided with peripherical grooves in order to guide the yarn in side directions.

Each linear motor device K and K1 is served by a unit KU1 respective Ku2. A master unit is designed with Ku3. A high sensitive yarn tension control system working with high response and accuracy is attained by the subject matter. The system is controllable with the applied signals/currents effected by the units. The coils are adapted in the magnetic field and displacable with the signals/currents in a very sensitive manner, known by itself i.e. at disc readers arrangement.

The yarn which is fed from the feed element is to have a certain tension in order to maintain its extended shape. The yarn accelerates and decelerates and there is a need for draw or tractive forces in both the ends whole the time. The necessary forces vary essentially during the feeding procedure of the yarn. The movements of the yarn is connected or timed with the mechanical structure of the loom and the geometrical movements depends on the generated forces and the demands of brake forces. The subject invention proposes to attain how forces is to be achieved at the unwinding end by optimum result. The force varies in dependence of the weaving rate and is low at low rates. The brake force has to vary during the feeding procedure of the yarn.

In the known devices the braking force is normally constant. It is important to avoid braking forces under at least some time slots in the weaving procedure. In the known machines great tension peaks occur at acceleration due to the fact that the braking force is adapted to manage the deceleration of the yarn. If acceleration and deceleration have the same rate value, the tension of the yarn will be high. The subject invention proposes a controlled tension force which varies under the weaving procedure and is kept to a minimum value during the whithe procedure. Forces are increased and decreased during whole the procedure. The squeeze brake K generates a supplementary forcee which is proportional to the squeeze force in the above second expression and a supplementary part which amplifies the force by deflecting the yarn over one or more (fixed) bend surfaces, see the first above expression. By varying the squeeze force and deflecting angle(-s) the brake force can be controlled to the wished value. There is an advantage in arranging a squeeze brake in the first position due to that the supplementary force in this type of brake is independent of the yarn force in the front of the brake. In the second brake step the force is proportional to the incoming force. A further advantage of two brake steps is evident from the fact that member K21 is able to move upwards at yarn accelerations and in such a way the force can be kept very low due to the yarn delivery from the excess attained from the curve of the yarn.

The cross elasticity of the yarn, like the thickness of the yarn, can be measured by means of member K14 which can measure the relative distance between members K11 and K12 at the same time as the force is measured. In such a way different information can be extruded in order to attain continuous control of the yarn quality. The force variations at a certain distance between members K11, K12 can be studied and knowledge of the uneveness of the yarn can be extracted. If the irregularities appear on determined distances the yarn speed can be measured by means of the time periods between the force peaks. If two squeeze brake are arrange with a determined distance between them speed measuring can take place by correlation between or of the force related signals. This speed measuring can be carried out on the wished yarn as long as it is uneven. Member K1 can be force controlled and then a rapid adjustment of the yarn force can be achieved. An eventual knot on the yarn may cause a supplementary force when it passes through member squeeze K11, K12. The control arrangement tries to keep the force constant by means of member K22 and member K21 is able to move upwards and the yarn feeding is effected from the yarn store between members K19 and K20 during the time the knot passes members K11, K12. The friction forces decrease rapidly when the deflection angle decreases. After the passage of the knot and the force has disappeared the force can rapidly be recovered when member K21 moves downwards. The function of the brake according to FIG. 10 is similar to that one of FIG. 11. The squeeze force is attained by the movement of member Mo2, which via the rocking lever effects the squeeze force. The deflection angle in two steps is attained by means of rotation of Mtb, which rotation is effected by arm Mt1 around motor Mt with moment M2. Another advantage is that the yarn can be withdrawn and be stretched afterwards. Member K11 can lock the yarn by means of enough value on force F and after that the yarn can be withdrawn by means of member K21. In such a way the yarn can be withdrawn to a certain point in order to attain an even rear edge. The yarn can be locked after members K20 and K21 and then it is possible to fill UD the yarn store between member K19, K20 with yarn which can be fed with low force by rapidly moving member K21 upwards whe the yarn start to accelerate.

Units KU1 and KU2 includes tables like table F2 in FIG. 10.

The invention is not limited to the embodiment shown above by way of example, but can be subjected to modifications within the scope of the following claims.

The embodiments of the invention in which an exclusive property or privilege is claimed are defined as follows:

1. In an apparatus for controlling a plurality of operational elements with the aid of a computerized system wherein the operational elements collectively form part of a textile machine, the computerized system including at least one computer, and a plurality of function control units which individually control at least one of said plurality of operational elements and which together form a network, the improvement wherein said network includes a connection means to which each said function control unit is connected for effecting data transmission between said respective function control unit and said textile machine, and wherein each of said operational elements comprises a yarn tension controller to control the tension of a respective strand of weft yarn disposed along a respective weft yarn path.

2. The apparatus as claimed in claim 1, wherein said yarn tension controller includes means for sensing the tension of said strand of weft yarn, and means for applying a frictional force to said stand of weft yarn.

3. The apparatus as claimed in claim 2, wherein said functional control unit is operatively coupled to said tension sensing means and said frictional force applying means to adjust said frictional force bearing on said strand of weft yarn in response to said sensing means.

4. The apparatus as claimed in claim 3, wherein said tension sensing means includes a torque providing means, a first frictional yarn contacting member having a first cylindrical envelope surface engaging said strand of weft yarn, a second frictional yarn contacting member disposed radially from said torque providing means, and a rocker arm pivotally coupling said second yarn contacting member to said torque providing means, said rocker arm permitting radial movement of said second yarn contacting member with respect to said torque providing mean, and said second yarn contacting member having a second cylindrical envelope surface engaging said strand of weft yarn and being nonrotatable with respect thereto.

5. The apparatus as claimed in claim 4, wherein said frictional force applying mean includes a second torque providing means, a yarn brake, and a second rocker arm coupling said second torque providing means to said yarn brake.

6. The apparatus as claimed in claim 5, wherein said yarn brake includes first and second opposing brake elements disposed along an axis extending traverse to said strand of weft yarn passing there between, said second rocker arm being coupled to said first brake element which is urgeable against said second brake element to apply said frictional force to said strand of weft yarn in a direction along said axis.

7. The apparatus as claimed in claim 6, wherein at lest one of said first and second brake elements is rotatable with respect to said strand of weft yarn.

8. The apparatus as claimed in claim 5, wherein said first-mentioned and said second torque providing means are limited angle torque motors.

9. The apparatus as claimed in claim 5, wherein said functional control unit sends a friction force adjustment signal to said second torque providing means in response to an angular displacement of said first-mentioned torque providing means.

10. The apparatus as claimed in claim 4, wherein said first and second cylindrical envelope surfaces include a friction generating material from the group consisting of diamonds, metal, metal oxide and ceramics.

11. The apparatus as claimed in claim 4, wherein said first frictional yarn contacting member is rotatable coupled to an axis of rotation of said torque providing means and is rotatable with respect to said strand of weft yarn.

12. The apparatus as claimed in claim 4, wherein said first frictional yarn contacting member is disposed adjacent said torque providing means and is nonrotatable with respect to said strand of weft yarn.

13. The apparatus as claimed in claim 3, wherein said functional control unit is a microprocessor.

14. The apparatus as claimed in claim 3, wherein said tension sensing means and said frictional force applying means each include a linear motor.

* * * * *

UNITED STATES PATENT AND TRADEMARK OFFICE
CERTIFICATE OF CORRECTION

PATENT NO. : 5,323,324
DATED : June 21, 1994
INVENTOR(S) : Lars-Berno FREDRIKSSON It is certified that error appears in the above-indentified patent and that said Letters Patent is hereby corrected as shown below:

```
Column 22, line 68; change "providing mean," to
                    ---providing means,---.
Column 23, line 5; change "applying mean" to
                   ---applying means---.
         line 17; change "wherein at lest" to
                   ---wherein at least---.
```

Signed and Sealed this

Eighteenth Day of October, 1994

Attest:

BRUCE LEHMAN

Attesting Officer

Commissioner of Patents and Trademarks